(12) United States Patent
Michielan et al.

(10) Patent No.: US 12,257,940 B2
(45) Date of Patent: Mar. 25, 2025

(54) CONTROLLER, VEHICLE AND METHOD

(71) Applicant: JAGUAR LAND ROVER LIMITED, Coventry (GB)

(72) Inventors: Carloalberto Michielan, Coventry (GB); Jason Bevis, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 208 days.

(21) Appl. No.: 17/754,180

(22) PCT Filed: Sep. 28, 2020

(86) PCT No.: PCT/EP2020/077134
§ 371 (c)(1),
(2) Date: Mar. 25, 2022

(87) PCT Pub. No.: WO2021/058827
PCT Pub. Date: Apr. 1, 2021

(65) Prior Publication Data
US 2022/0289088 A1      Sep. 15, 2022

(30) Foreign Application Priority Data
Sep. 27, 2019   (GB) ..................... 1913944

(51) Int. Cl.
*B60N 2/90* (2018.01)
*B60N 2/00* (2006.01)
*B60N 2/02* (2006.01)

(52) U.S. Cl.
CPC ............ *B60N 2/90* (2018.02); *B60N 2/0025* (2023.08); *B60N 2/0273* (2023.08);
(Continued)

(58) Field of Classification Search
CPC .... B60N 2/90; B60N 2/002; B60N 2002/981; B60N 2/0272; B60N 2/0268;
(Continued)

(56) References Cited

U.S. PATENT DOCUMENTS

| 6,068,339 A | 5/2000 | Linzalone |
| 9,123,215 B2 | 9/2015 | Kiefer et al. |

(Continued)

FOREIGN PATENT DOCUMENTS

| EP | 2778850 A1 | 9/2014 |
| WO | 2015181378 A1 | 12/2015 |
| WO | 2018027168 A1 | 2/2018 |

OTHER PUBLICATIONS

Great Britain Intellectual Property Office, Combined Search and Examination Report under Sections 17 & 18(3) Issued in Application No. GB1913944.3, Mar. 20, 2020, 8 pages.

(Continued)

*Primary Examiner* — Sisay Yacob
(74) *Attorney, Agent, or Firm* — McCoy Russell LLP

(57) ABSTRACT

A controller for controlling a haptic feedback actuator of a vehicle, the controller comprising: at least one input for receiving: vehicle parameter information being information indicative of a current value of at least one parameter associated with the vehicle; and information indicating that it is required to provide haptic feedback, a processor being arranged, in response to receipt of information indicating that haptic feedback is required, to generate a control signal for controlling operation of the haptic feedback actuator, the control signal being responsive at least in part to the vehicle parameter information; and an output for outputting the control signal.

14 Claims, 7 Drawing Sheets

(52) U.S. Cl.
CPC .... *B60N 2002/981* (2018.02); *B60N 2230/10* (2023.08); *B60N 2230/30* (2023.08)

(58) Field of Classification Search
CPC .................. B60N 2/02246; B60N 2/0244; B60N 2/0296; B60Q 9/00; B60W 50/16; G06F 3/016
See application file for complete search history.

(56) References Cited

U.S. PATENT DOCUMENTS

| | | | |
|---|---|---|---|
| 10,059,228 B1 | 8/2018 | Aikin et al. | |
| 10,176,681 B2 | 1/2019 | Plewe et al. | |
| 10,399,492 B1 | 9/2019 | Paraskevas et al. | |
| 2005/0258977 A1 | 11/2005 | Kiefer et al. | |
| 2007/0296366 A1 | 12/2007 | Quaid et al. | |
| 2009/0259359 A1 | 10/2009 | Whitton et al. | |
| 2009/0292423 A1* | 11/2009 | Norton ................ | B60R 21/0154 701/45 |
| 2012/0081234 A1 | 4/2012 | Shaffer et al. | |
| 2013/0062921 A1* | 3/2013 | Meyer ................... | B60N 2/976 297/354.1 |
| 2013/0342366 A1* | 12/2013 | Kiefer ..................... | B60Q 9/00 340/407.1 |
| 2014/0118126 A1 | 5/2014 | Garg et al. | |
| 2015/0008710 A1* | 1/2015 | Young ................... | B60N 2/914 297/217.3 |
| 2015/0375865 A1 | 12/2015 | Fischer et al. | |
| 2017/0021762 A1 | 1/2017 | Daman | |
| 2017/0076564 A1* | 3/2017 | Cruz-Hernandez ...... | B60Q 9/00 |
| 2017/0185153 A1 | 6/2017 | Tanaka | |
| 2017/0210415 A1* | 7/2017 | Whittle ................ | B62D 15/029 |
| 2017/0340214 A1* | 11/2017 | Benson ................ | A61B 5/0245 |
| 2018/0015933 A1 | 1/2018 | Truong | |
| 2018/0056867 A1 | 3/2018 | Modarres et al. | |
| 2019/0235628 A1 | 8/2019 | Lacroix et al. | |
| 2021/0401340 A1* | 12/2021 | Gallagher ............ | A61B 5/7405 |

OTHER PUBLICATIONS

ISA European Patent Office, International Search Report and Written Opinion Issued in Application No. PCT/EP2020/077134, Mar. 19, 2021, WIPO, 13 pages.

* cited by examiner

CONTROLLER, VEHICLE AND METHOD

CROSS REFERENCE TO RELATED APPLICATIONS

The present application is a U.S. National Phase of International Application No. PCT/EP2020/077134 entitled "CONTROLLER, VEHICLE AND METHOD," and filed on Sep. 28, 2020. International Application No. PCT/EP2020/077134 claims priority to Great Britain Patent Application No. 1913944.3 filed on Sep. 27, 2019. The entire contents of each of the above-listed applications are hereby incorporated by reference for all purposes.

TECHNICAL FIELD

The present disclosure relates to a vehicle controller and control method and particularly, but not exclusively, to a controller and a method for controlling the provision of haptic feedback in a vehicle. Aspects of the disclosure relate to a controller, system, motor vehicle seat, vehicle and method for providing haptic feedback in a vehicle.

BACKGROUND

The present applicant has recognised that current haptic feedback systems employed in vehicles are of variable utility and do not always have the desired effect of drawing a user's attention to the potential need to take action in a given situation.

It is an aim of the present disclosure to address one or more disadvantages associated with the prior art.

SUMMARY

Aspects of the disclosure provide a controller, apparatus, a vehicle and a method.

According to an aspect of the present disclosure there is provided a control system for controlling a haptic feedback actuator of a motor vehicle, the control system comprising one or more controllers. The control system is configured to: receive vehicle parameter information being information indicative of a current value of at least one parameter associated with the vehicle; receive information indicating that it is required to provide haptic feedback; in response to receipt of information indicating that haptic feedback is required, generate a control signal for controlling operation of the haptic feedback actuator, the control signal being responsive to the vehicle parameter information; and output the control signal.

When it is determined that haptic feedback is required, the haptic feedback may be adjusted according to the vehicle parameter information. The controller, rather than output the same control signal regardless of vehicle parameter information, may take the vehicle parameter information into account and adjust the control signal accordingly. Thus, the problem that a user fails to detect the haptic feedback due to masking of the feedback in the presence of vibrations associated with other sources of vibration such as a powertrain of the vehicle and/or a surface over which the vehicle is driving may be reduced.

By the term "current value of at least one parameter associated with the vehicle" is meant a value of the at least one parameter being a dynamic parameter the value of which may change from moment to moment during the course of a journey such as one or more of vehicle speed, powertrain state such as the state of an engine of the vehicle and/or engine speed, suspension articulation, cabin vibration amplitude and/or frequency and acoustic noise level.

In some embodiments, the one or more controllers may collectively comprise: at least one electronic processor having an electrical input for receiving the vehicle parameter information indicative of the current value of at least one parameter associated with the vehicle, and the information indicating that it is required to provide haptic feedback; and at least one memory device electrically coupled to the at least one electronic processor and having instructions stored therein;
and wherein the at least one electronic processor is configured to access the at least one memory device and execute the instructions thereon so as to, in response to receipt of information indicating that haptic feedback is required, generate a control signal for controlling operation of the haptic feedback actuator, the control signal being responsive to the vehicle parameter information, and outputting the control signal.

In some embodiments, the control system may comprise a control system for controlling a haptic feedback actuator within a vehicle seat and the vehicle parameter information comprises information indicative of a current state of a vehicle seat.

In some embodiments, the vehicle parameter information may comprise at least one from a group consisting of at least one of:
information indicative of a weight of a person sat on the vehicle seat;
information indicative of a forward/aft position of the vehicle seat with respect to a body of the vehicle; and
information indicative of a position of a back portion.

In some embodiments, the vehicle parameter information may comprise information indicative of haptic noise experienced by a driver of the vehicle.

In some embodiments, the control system may be arranged to generate the control signal to control an amplitude of the haptic feedback provided by the haptic feedback actuator in dependence at least in part on the vehicle parameter information.

In some embodiments, the control system may be arranged to generate the control signal to control at least one of frequency, amplitude and phase of vibrations of the haptic feedback provided by the haptic feedback actuator in dependence on the vehicle parameter information.

In some embodiments, the control system may be arranged to generate the control signal to control a duration of pulses of vibrations and/or period between pulses of vibrations provided by the haptic feedback actuator in dependence on the vehicle parameter information.

In some embodiments, the information indicative of a value of at least one parameter associated with the vehicle may comprise information indicative of rate of acceleration of at least a portion of a structure of the motor vehicle.

The information indicative of rate of acceleration of at least a portion of structure of the motor vehicle may comprise information indicative of rate of acceleration of a portion of the vehicle in a vicinity of a person to whom the haptic feedback is to be provided such as a seat in which the person is sitting.

In some embodiments, the control system may be configured to receive information indicative of rate of acceleration of at least a portion of a structure of the motor vehicle from an accelerometer.

In some embodiments, the control system may be configured to receive vehicle parameter information being information indicative of at least one of:

a level of acoustic noise in a cabin of the vehicle;
a speed of travel of the vehicle over ground; and
a geographical location of the vehicle.

According to a further aspect of the present disclosure there is provided a vehicle assembly comprising a control system as described herein in combination with a haptic feedback actuator.

According to a further aspect of the present disclosure there is provided a vehicle seat comprising a control system or a vehicle assembly as described herein.

In some embodiments, the vehicle seat may comprise an accelerometer arranged to provide seat acceleration information to the haptic feedback controller.

According to a further aspect of the present disclosure there is provided a vehicle comprising a control system, a vehicle assembly or a vehicle seat as described herein.

According to a further aspect of the present disclosure there is provided a method of providing haptic feedback in a vehicle, comprising:

receiving vehicle parameter information being information indicative of a current value of at least one parameter associated with the vehicle; and receiving information indicating that it is required to provide haptic feedback, the method comprising, in response to receipt of information indicating that haptic feedback is required, controlling operation of the haptic feedback actuator, whereby controlling operation of the haptic feedback actuator comprises controlling the actuator responsive at least in part to the vehicle parameter information.

According to a further aspect of the present disclosure there is provided a computer program comprising instructions which, when the program is executed by one or more processors, cause the one or more processors to carry out a method of providing haptic feedback in a vehicle as described herein.

According to a further aspect of the present disclosure there is provided a non-transitory, computer-readable storage medium storing instructions thereon that when executed by one or more processors causes the one or more processors to carry out a method of providing haptic feedback in a vehicle as described herein.

Within the scope of this application it is expressly intended that the various aspects, embodiments, examples and alternatives set out in the preceding paragraphs, in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

For the avoidance of doubt, it is to be understood that features described with respect to one aspect of the disclosure may be included within any other aspect of the disclosure, alone or in appropriate combination with one or more other features.

BRIEF DESCRIPTION OF THE FIGURES

One or more embodiments of the disclosure will now be described, by way of example only, with reference to the accompanying drawings, in which.

DETAILED DESCRIPTION

Figure 1:
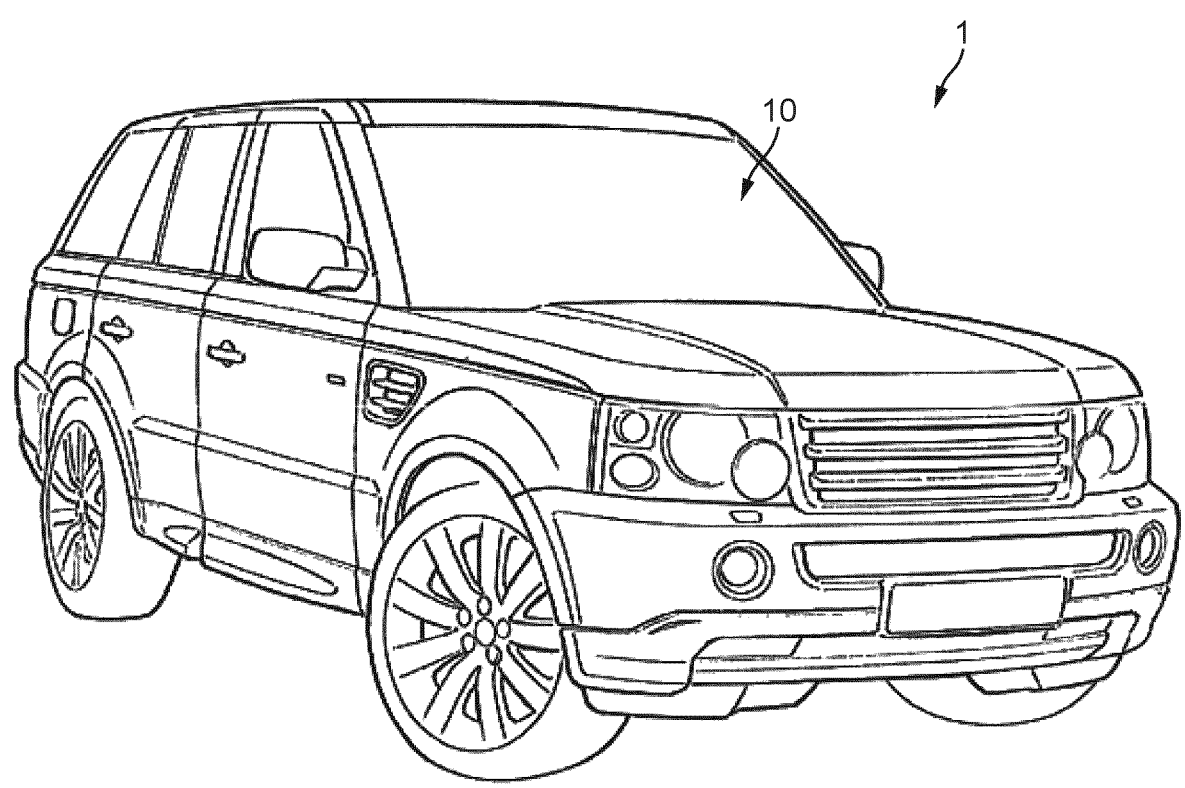
FIG. 1 is a schematic illustration of a vehicle according to an embodiment of the present disclosure.
Figure 2:
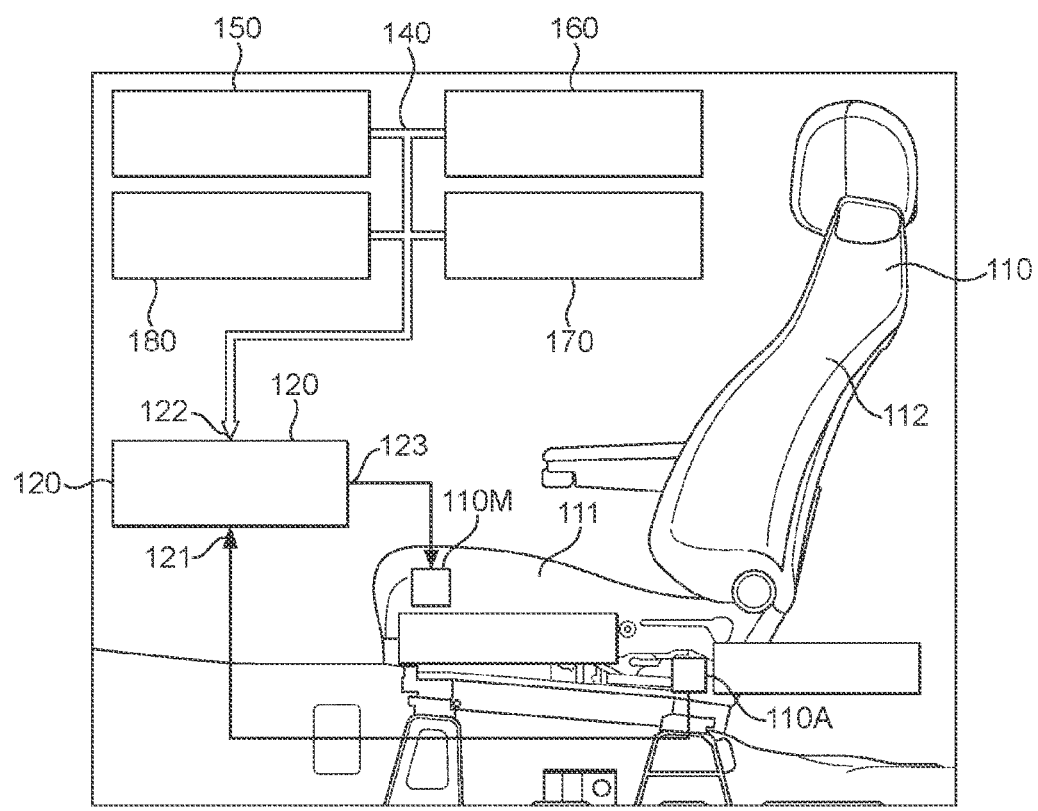
FIG. 2 is a schematic side-view illustration of a portion of a cabin of the vehicle of FIG. 1 showing a seat having a haptic motor and accelerometer coupled to a controller according to an embodiment of the present disclosure.
Figure 3A:
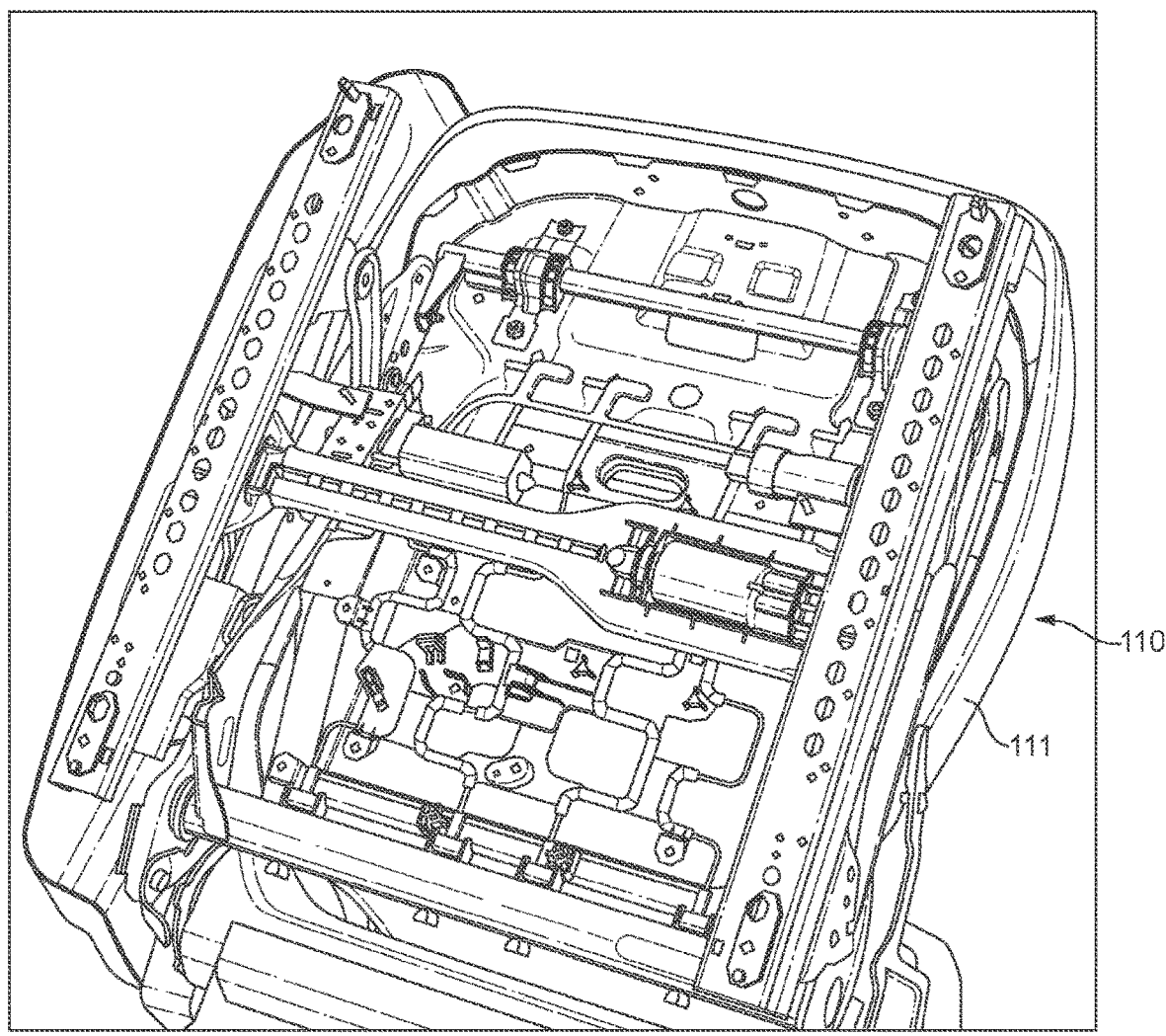
FIGS. 3A and 3B respectively show an underside of the driver seat of FIG. 2 before and after a haptic motor is fitted, the image of FIG. 3B being an enlarged view of a front region of the underside of the seat.
Figure 3B:
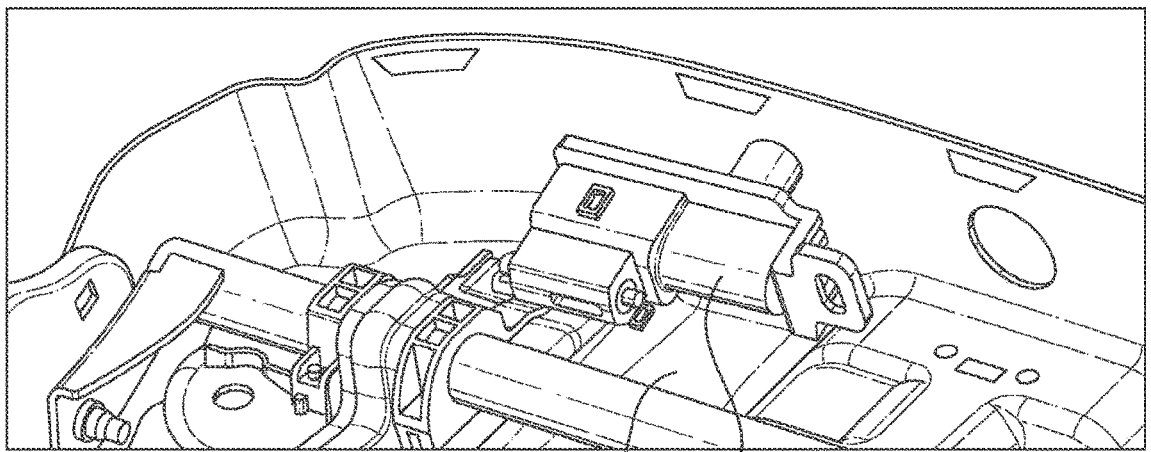

FIG. 1 shows a vehicle 1 according to an embodiment of the present disclosure having a cabin 1C. FIG. 2 is a schematic illustration of a portion of the cabin 1C of the vehicle of FIG. 1 in side view. The cabin has a driver seat 110 having a lower seat portion 111 on which a driver sits and a back portion 112 against which a driver may rest their back when driving. In the present embodiment, a haptic feedback actuator in the form of a haptic feedback electric motor 110M is provided on an underside of the lower seat portion 111. An accelerometer 110A is also mounted on the underside of the lower seat portion 111. The accelerometer 110A (also referred to as a 'seat accelerometer 110A') is provided at a location away from the haptic feedback motor 110M and adjacent a body mount of the seat 110 by means of which the seat 110 is coupled to a floor of the vehicle 1. FIG. 3A shows an underside of the seat 110 of FIG. 2 prior to installation of the haptic feedback motor 110M and seat accelerometer 110A. FIG. 3B shows a front region of the underside of the seat 110 following installation of the haptic feedback motor 110M. However, it is to be understood that in some embodiments the haptic feedback actuator 110M may be placed in another location such as within the seat portion 111, within the back portion 112 or any other suitable location. More than one. haptic feedback actuator 110M may be employed in some embodiments.

It is to be understood that in some embodiments the accelerometer 110A may be replaced with one or more alternative sensors capable of outputting a signal indicative of a level of haptic noise such as vibration experienced by the driver, for example a rate of acceleration of the vehicle 1. Examples of such alternative sensors include, but are not limited to, sensors that detect displacement, velocity, pressure, weight, force, voltage, current, etc. It is further to be understood that the accelerometer 110A or alternative sensor(s) is not limited to being mounted to the seat 110, and may be mounted elsewhere in the vehicle 1.

As illustrated in FIG. 2, the vehicle 1 has an electronic control unit (ECU) 120 providing adaptive haptic seat controller (AHC) functionality. The ECU 120 will therefore also be referred to as an AHC 120. The AHC 120 is configured to control the haptic feedback motor 110M to provide haptic feedback to the seat occupant when required.

The AHC 120 has a first input portion 121 configured to receive a signal by means of a wired connection from the seat accelerometer 110A, the signal being indicative of rate of acceleration of the vehicle 1 with respect to each of three mutually orthogonal x, y, z axes. A second input portion 122 of the AHC 120 is also configured to receive signals including a signal indicating when it is required to provide haptic feedback to the seat occupant. In the present embodiment, the second input portion 122 is coupled to a vehicle communications bus 140 and is configured to receive signals broadcast on the bus as well as broadcasting signals on the bus itself, as discussed in more detail below. In some embodiments the bus may be provided in the form of a controller area network (CAN) bus. In the embodiment of FIG. 2 the AHC 120 is configured to monitor the vehicle bus 140 for signals broadcast by an ADAS (advanced driver assistance system) control module 150, seat control module 160, active NVH (noise, vibration and harshness) control module 170 and vehicle control module 180. However, it is to be understood that in some embodiments the AHC 120 may be connected to any other module in the vehicle.

As noted above, in the present embodiment the AHC 120 receives a signal indicative of a rate of acceleration of the vehicle 1 with respect to x,y,z axes from the seat accelerometer 110A. However, it is to be understood that in some embodiments, instead of the rate of acceleration, any signal output from the seat accelerometer 110A or any other sensor may be provided to the AHC 120.

The AHC 120 has an output 123 configured to provide control signals to the haptic feedback motor 110M. In the present embodiment the AHC 120 is able to control the amplitude, frequency and phase of vibrations generated by the haptic feedback motor 110M. The AHC 120 is configured to generate a repeated cycle of one or more pulses of vibrations, each pulse being of predetermined frequency and duration, with a predetermined amount of time between pulses. The length of each cycle of one or more pulses defines the 'pulse period'. Each cycle may be referred to as a 'haptic feedback profile'.

Figure 4:
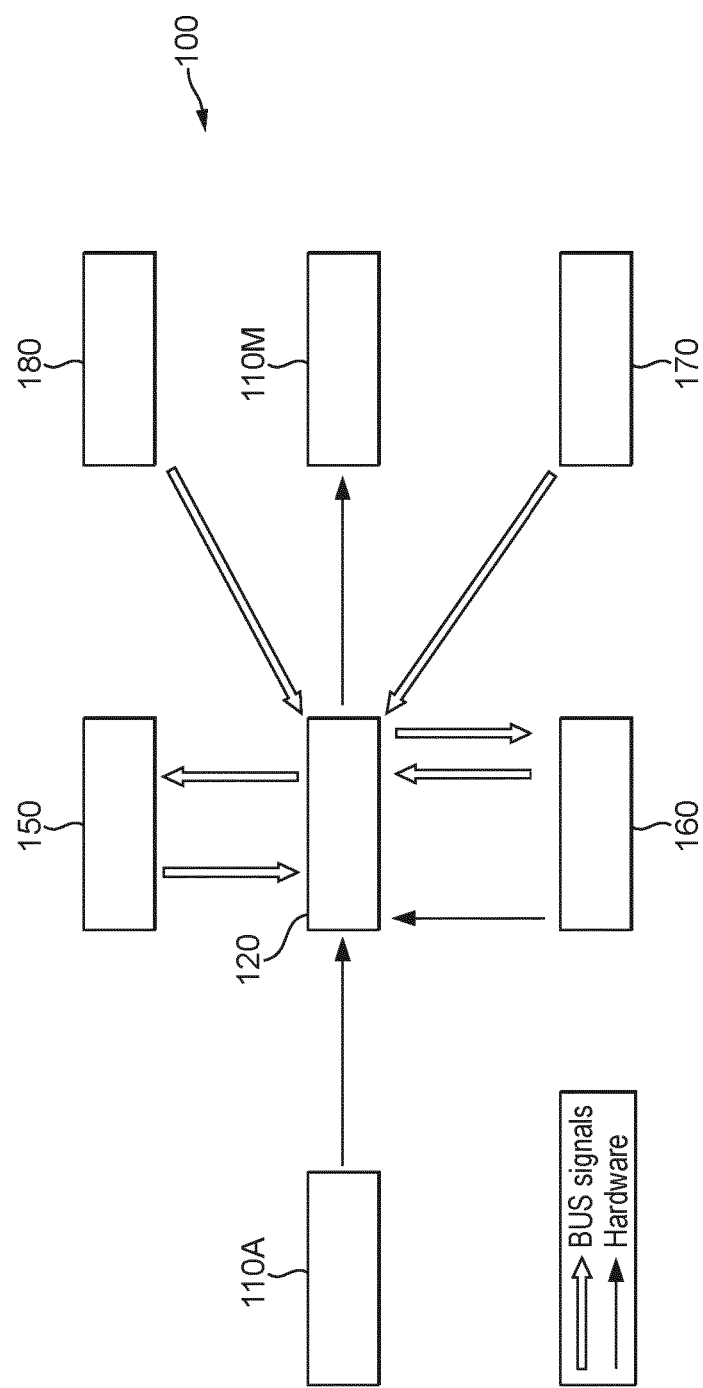
FIG. 4 is a block diagram illustrating schematically a haptic seat control system according to an embodiment of the disclosure in the vehicle of FIG. 1.

FIG. 4 is a block diagram illustrating schematically a haptic seat control system 100 according to an embodiment of the disclosure installed in the vehicle of FIG. 1. The system includes the AHC 120 of FIG. 2. In the embodiment of FIGS. 1 to 4 the AHC 120 is installed in the vehicle 1 at a location that is separate from the seat 110. However, it is to be understood that in some embodiments the AHC 120 may be installed in or attached to the seat 110 itself, for example being coupled to an underside of the seat 110.

As described above, the AHC 120 is configured to monitor the vehicle bus 140 for signals broadcast by ADAS (advanced driver assistance system) control module 150, seat control module 160, active NVH (noised, vibration and harshness) control module 170 and vehicle control module 180. However, it is to be understood that in some embodiments the AHC 120 may be connected to any other module in the vehicle.

In some embodiments, the AHC 120 is configured to receive from the ADAS control module 150 via the vehicle bus a signal indicative that it is required to provide haptic feedback to a driver of the vehicle, a signal indicative of road condition, vehicle position (GPS) and a video signal from one or more interior cameras of the vehicle 1. By interior camera is meant a camera arranged to provide a video signal showing at least a portion of an interior environment of the vehicle 1, such as a driver and/or passenger face or upper body. In some embodiments the AHC 120 may receive one or more other ADAS signals in addition or instead.

In the embodiment of FIGS. 1 to 4 the seat control module 160 is installed in the seat 110 although in some alternative embodiments it may be located remote from the seat, such as behind a dashboard of the vehicle 1 or within an engine compartment or rear trunk (boot) region. The AHC 120 receives from the seat control module 160 via the vehicle bus 140 and in respect of the driver seat 110, signals indicative of a weight of a person sat on the seat 110 based on an output of a weight sensor (not shown), a signal indicative of a forward/aft position of the seat 110 with respect to a body of the vehicle (where the seat is adjustable in a forward/aft direction) and a position of the back portion 112 (where the seat back portion 112 is pivotable about a lower region thereof). In the present embodiment, the AHC 120 receives this data in respect of the driver seat of the vehicle 1 only, being the only seat that is under the control of the AHC 120, the AHC 120 distinguishing driver seat information broadcast by the seat control module 160 from other seat information based on a seat identifier code associated with the broadcast signals. Thus, it is to be understood that the data broadcast on the vehicle bus 140 by the seat control module 160 may include corresponding data in respect of each seat of the vehicle, where appropriate, this data being ignored by the AHC 120. It is to be understood that in some embodiments the AHC 120 may receive any seat control module 160 signal available. Furthermore, it is to be understood that in some embodiments the AHC 120 may control a haptic feedback motor 110M installed in each of a plurality seats in which case corresponding data in respect of each seat under the control of the AHC 120 may be obtained by the AHC 120.

As noted above, the AHC 120 also receives a seat acceleration signal corresponding to the rate of acceleration of the seat 110 in three mutually orthogonal directions (X, Y, Z) as determined by the seat accelerometer 110A. In the present embodiment the seat acceleration signal is received from the seat control module 160 by means of a direct, wired, connection rather than via the vehicle bus 140, enabling the AHC 120 to receive acceleration data at a faster rate than would otherwise be possible via the vehicle bus 140. In some embodiments the seat acceleration signal is received directly from the accelerometer via a wired connection rather than via the seat control module 160.

The AHC 120 receives from the active NVH control module 170 via the vehicle bus 140 data indicative that an NVH system associated with the module 170 is active, and in addition data indicative of a rate of acceleration of each of one or more wheels of the vehicle, and data indicative of a level of cabin noise, being an audible sound level in the cabin of the vehicle 1. It is to be understood that the data indicative of cabin noise may include data indicative of an overall cabin noise level including sound being played by an infotainment system such as a radio broadcast, satnav audio directions and so forth. However, it is to be understood that in some embodiments the AHC 120 may receive any signal available from the active NVH control module 170.

The AHC 120 receives from the vehicle control module 180 via the vehicle bus 140 signals indicative of vehicle speed, accelerator pedal position, engine speed and load, and optionally one or more signals indicative of vehicle body acceleration. However, it is to be understood that in some embodiments the AHC 120 may receive any signal available from the vehicle control module 180. It is to be understood that the vehicle control module 180 may provide information in respect of one or more of engine speed and load. Such information may be used to control or adjust the haptic feedback generated by the AHC 120 in order to ensure that a person to whom the haptic feedback is provided is able to sense the feedback so that they can take appropriate action. Thus, the AHC 120 uses the information to adjust the feedback provided so as to reduce a risk that the person to whom the feedback is provided fails to recognise the feedback or mistakes the feedback for vibrations associated with the powertrain or surface over which the vehicle 1 is driving.

The AHC 120 is configured to output to the haptic feedback motor 110M a motor command signal indicative of amplitude and frequency of vibrations to be generated by the motor 110M. It is to be understood that the AHC 120 is configured to control the phase of the vibrations generated by the haptic feedback motor 110M relative to vibrations to which the seat is subject by virtue of being coupled to the body of the vehicle 1, by controlling a timing of the amplitude and frequency signals output to the haptic feedback motor 110M although as noted above in some embodiments the AHC 120 may output a signal indicative of phase in addition. In this case, in some embodiments, the phase signal may indicate the phase of the vibrations to be generated by the haptic feedback motor 110M with respect to a reference timing signal, for example a signal broadcast on the vehicle bus 140 or otherwise coordinated via the vehicle bus 140. In some embodiments synchronisation of signals in order to allow control of the phase of the haptic feedback vibrations relative to vehicle-induced seat vibrations may be implemented by means of a direct wired connection between the ECU 120 and haptic feedback motor 110M. It is to be understood that in the present embodiment the haptic feedback motor 110M comprises a motor controller that receives the signals from the AHC 120 and causes the motor 110M to generate corresponding vibrations. However, it is to be understood that in some embodiments the AHC 120 may control the haptic seat motor 110M by vehicle bus communications.

Figure 5:
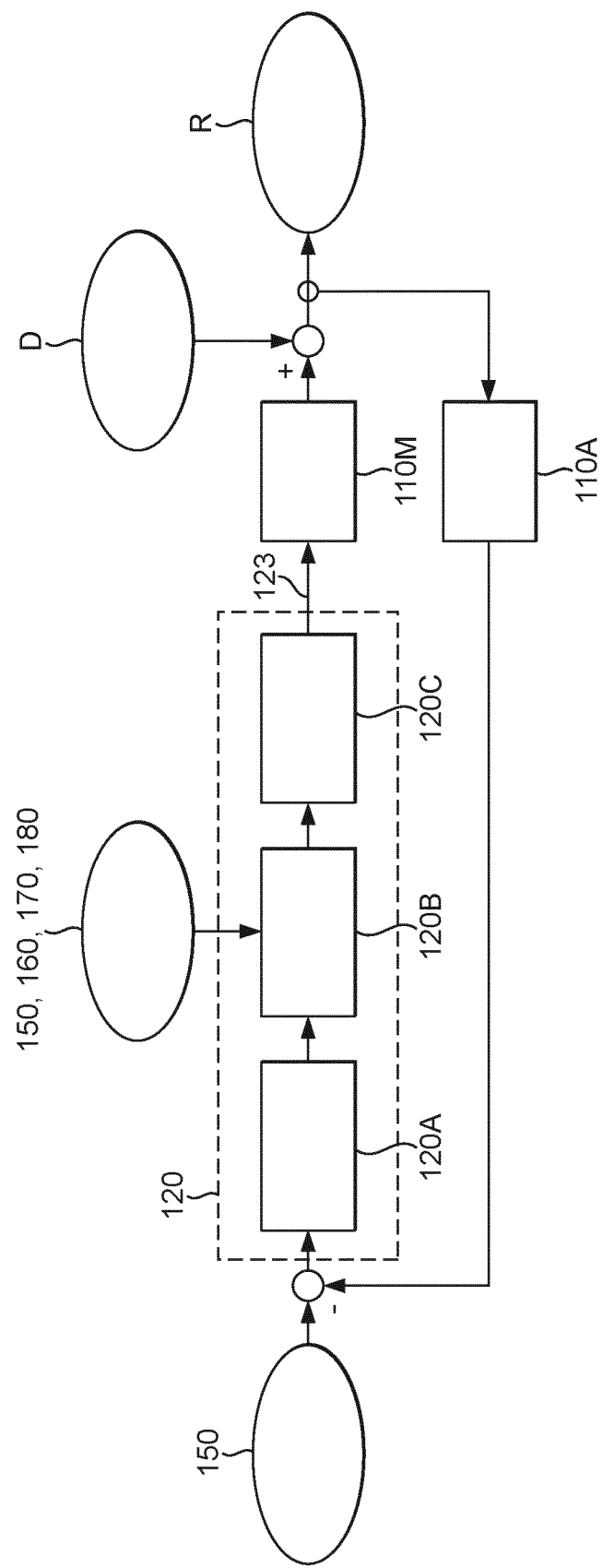
FIG. 5 is a block diagram illustrating schematically a haptic seat controller forming part of the system of FIG. 4.

FIG. 5 illustrates schematically operation of the AHC 120 in further detail. As shown in FIG. 5, the AHC 120 receives from the ADAS control module 150 information indicating when it is required to provide haptic feedback to a driver of the vehicle by means of the driver seat 110. The information is also indicative of the desired type of haptic feedback. The AHC 120 receives the information and determines, based on the information, which one of a plurality of haptic feedback profiles is to be generated. By haptic feedback "type" is meant the type of situation that the haptic feedback is intended to alert a driver to. For example, in some embodiments different types of haptic feedback may be provided in (a) the case the driver appears to be departing from a lane when an obstruction is present, such as a vehicle in a lane adjacent the vehicle 1 and towards which the vehicle 1 is veering, versus (b) the case where the vehicle 1 requires to transition from a condition in which the vehicle 1 is being driven autonomously (steering and speed) and a condition in which the driver is required to resume full hands-on control of vehicle steering and speed.

The AHC 120 also receives the seat acceleration information generated by the seat control module 160 based on acceleration data generated by the seat accelerometer 110A. The AHC 120 subjects the seat acceleration information to digital signal processing by means of a first function block in the form of a digital signal processing (DSP) function block 120A comprised by the AHC 120. The DSP function block 120A passes the information indicative of the required haptic feedback type and the processed seat acceleration information to a second function block 120B. The second function block 120B also receives the information described above broadcast on the vehicle bus 140 by the ADAS control module 150, seat control module 160, active NVH control module 170 and vehicle control module 180.

The second function block 120B performs prescribed processing of the signals received from the ADAS control module 150, seat control module 160, active NVH control module 170 and vehicle control module 180.

As described above, the AHC 120 receives from the active NVH control module 170 via the Vehicle bus 140 data indicative that an NVH system associated with the module 170 is active, and in addition data indicative of, for example, a rate of acceleration of each of one or more wheels of the vehicle, and data indicative of a level of cabin noise, being an audible sound level in the cabin of the vehicle 1.

The AHC 120 receives from the vehicle control module 180 via the vehicle bus 140 signals indicative of, for example, vehicle speed, accelerator pedal position, engine speed and load, and optionally one or more signals indicative of vehicle body acceleration.

The AHC 120 receives from the ADAS control module 150 via the vehicle bus a signal, for example, indicative that it is required to provide haptic feedback to a driver of the vehicle, a signal indicative of road condition, vehicle position (GPS) and a video signal from an interior camera.

The AHC 120 receives from the seat control module 160 via the vehicle bus 140 and in respect of the driver seat 110, signals indicative of, for example, a weight of a person sat on the seat 110 based on an output of a weight sensor (not shown), a signal indicative of a forward/aft position of the seat 110 with respect to a body of the vehicle (where the seat is adjustable in a forward/aft direction) and a position of the back portion 112 (where the seat back portion 112 is pivotable about a lower region thereof).

The second function block 120B of the illustrated embodiment may be configured to undertake a look-up in a multidimensional calibrated function map. For example, the digital signal of the acceleration difference is the first coordinate and the other coordinates can come from the ADAS control module 150, seat control module 160, active NVH control module 170 and vehicle control module 180. The results of these intersections in the data maps is the control signal of the haptic motor. The output can be based on real time analysis and also on history of data measured before the current loop. In some embodiments history data analysis is computed by a moving average function, however it can be achieved with different functions.

In some embodiments, the AHC 120 performs a Fourier spectral analysis of the processed seat acceleration information and determines whether a moving average amplitude of vibrations within a prescribed frequency range exceeds a prescribed value. In some embodiments the prescribed frequency range is the range from 80 Hz to 100 Hz since a frequency of 90 Hz may be considered to be a substantially optimum frequency for the provision of haptic feedback to a driver of a vehicle via the seat 110. It is to be understood that other frequencies of haptic feedback vibrations may be useful in some alternative embodiments. In some embodiments, if the moving average amplitude does not exceed the prescribed value, the second function block 120B outputs to adaptation function block 120C information indicating the current moving average amplitude of vibrations in the frequency range 80-100 Hz and a signal indicative of the phase of vibrations at substantially 90 Hz.

The adaptation function block 120C is fed with the output of the function block 120B and it adapts the control signal to the haptic motor 110M in order to harmonise the feedback with all the boundary conditions. For example, the adaptation function block 120C may feed the measured moving average amplitude of vibrations calculated by the second function block 120B into a look-up table (LUT) together with the information indicative of the desired haptic feedback profile received from the ADAS control module 150. The adaptation function block generates a corresponding haptic feedback profile, defining the haptic feedback cycle period, pulse frequency and width (in time), the amplitude of the pulses, and a time delay in order to achieve a desired phase of the feedback. The AHC 120 then outputs a control signal to the haptic feedback motor 110M indicative of the amplitude, frequency and phase of the vibrations that the haptic feedback motor 110M is to generate, the frequency in the present embodiment being, for example, substantially 90 Hz. It is to be understood that the second function block 120B is configured to cause the haptic feedback motor 110M to generate the vibrations such that they enhance the driver feedback, reducing or amplifying any existing vibrations of the seat.

The second function block 120B is configured to identify a frequency band away from dominant frequencies of vibration of the seat 110A, at which it is appropriate to provide haptic feedback. It is to be understood that, in the present embodiment, the allowable range of frequencies for the provision of haptic feedback is in the range from 20 Hz to substantially 200 Hz. Other ranges may be useful in some embodiments, such as the range from 60 Hz to 150 Hz, 60 Hz to 140 Hz or any other suitable range of frequencies. In some embodiments, the second function block 120B identifies a frequency band of, for example, at least 20 Hz in width over which the measured moving average amplitude of vibrations does not exceed the above-mentioned prescribed value. The second function block may then output the centre frequency of the identified range to the adaption function block 120C together with the information indicating the current moving average amplitude of vibration in the frequency band identified, being the band centred on the determined centre frequency, and a signal indicative of the phase of vibrations at the centre frequency. Other arrangements may be useful in some embodiments.

The adaptation function block 120C may then feed this measured moving average amplitude of vibrations calculated by the second function block 120B into a look-up table (LUT) together with the information indicative of the desired haptic feedback profile received from the ADAS control module 150. The adaptation function block generates a corresponding haptic feedback profile, defining the haptic feedback cycle period, pulse frequency and width (in time) and the amplitude of the pulses to be generated. The ECU 120 then outputs a control signal to the haptic feedback motor 110M indicative of the amplitude and frequency of the vibrations that the haptic feedback motor 110M is to generate, the frequency in this case being the identified centre frequency. It is to be understood that the second function block 120B is configured to cause the haptic feedback motor 110M to generate the vibrations such that they are substantially in phase with any existing vibrations of the seat 110 at the centre frequency so that vibrations generated by the haptic feedback motor 110M tend to enhance the amplitude of vibrations at the centre frequency and not reduce them.

The AHC 120 is configured wherein the number of cycles of the haptic feedback profile generated is dependent on the amount of time for which the AHC 120 detects the presence on the vehicle bus 140 of the signal from the ADAS control module 150 indicating that haptic feedback is to be provided to the occupant of the seat 110. In some embodiments, once the signal is no longer detected, the AHC 120 terminates causing the haptic feedback motor 110M to generate the haptic feedback once the current haptic feedback profile cycle is complete. In some alternative embodiments, the AHC 120 may terminate causing the haptic feedback motor 110M to provide the haptic feedback as soon as the signal indicating that haptic feedback is to be provided to the occupant of the seat 110 is no longer detected. Other arrangements may be useful in some embodiments.

In the present embodiment the AHC 120 is configured to generate haptic feedback having a substantially fixed cycle length of substantially 1s. Other lengths may be useful in some alternative embodiments. The AHC 120 stores two haptic feedback profiles illustrated schematically in FIG. 6A and FIG. 6B respectively. However, it is to be understood that in some embodiments, the severity of the feedback can be adjusted. The AHC 120 may have an adaptive cycle length according to the calibrated function in the block 120B. It is to be understood that in some embodiments also the feedback profile can be adaptive. The calibrated function in the block 120B may require to modify the sequence of activation according to any other inputs from other modules.

Figure 6A:
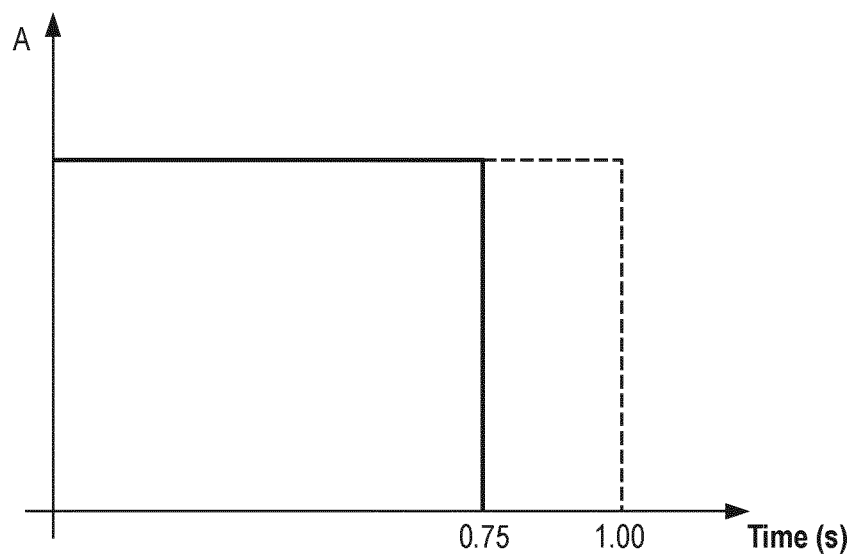
FIGS. 6A and 6B are respective schematic illustrations of haptic feedback profiles that may be generated by the haptic seat control system.
Figure 6B:
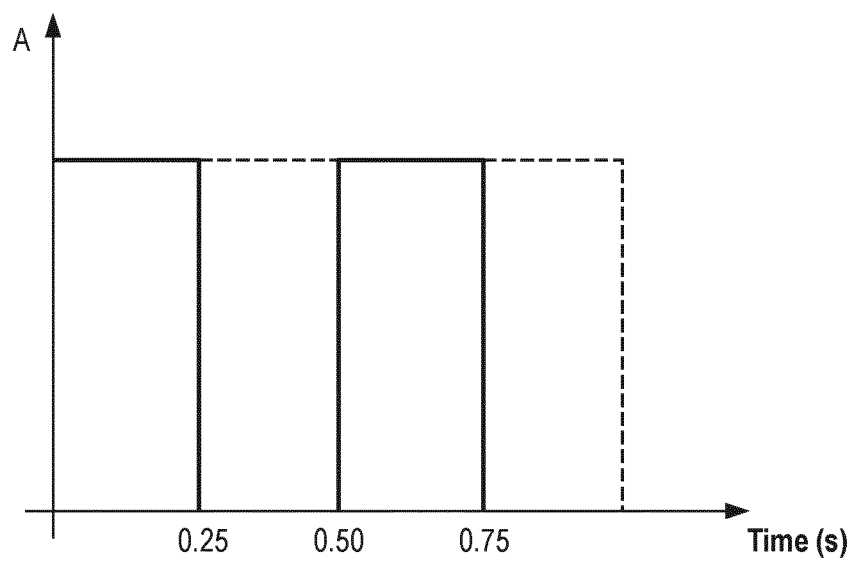

FIGS. 6A and 6B show examples of haptic feedback profiles in the form of plots of amplitude A of the haptic feedback vibrations to be generated by the haptic feedback motor 110M as a function of time t. For the first haptic feedback profile of FIG. 6A the AHC 120 causes the haptic feedback motor 110M to generate a single pulse of vibrations having a pulse width of 0.75s. The first haptic feedback profile of FIG. 6A may have an amplitude that increases with increasing moving average amplitude of vibrations detected by the accelerometer 110A. The AHC 120 controls the control signal to the haptic motor 110M in order to not exceed predefined limit values. If the control signal exceeds the limits, the control signal is set to the limit value. The limit value is modifiable according to vehicle specifications. In the present embodiment the default frequency of the vibrations may be substantially 90 Hz as noted above but may be adjusted by the ECU 120 in dependence on the moving average amplitude of vibrations in the frequency range 80-100 Hz as described above. Other arrangements may be useful in other embodiments.

The AHC 120 may generate haptic feedback according to the profile of FIG. 6A in the event a signal is received from the ADAS control module 150 indicating that a lane departure warning system has been activated, i.e. the ADAS control module 150 has determined that the vehicle 1 is deviating from a lane of a multi-lane highway on which the vehicle 1 is being driven.

For the second haptic feedback profile of FIG. 6B the ECU 120 causes the haptic feedback motor 110M to generate a series of pulses of vibrations, each pulse having a pulse width of 0.25s and with an interval of 0.25s between pulses. The pulses again may have an amplitude that increases with increasing moving average amplitude of vibrations detected by the accelerometer 110A. The default frequency of the vibrations may be substantially 90 Hz as noted above, but may be adjusted by the ECU 120 in dependence on the moving average amplitude of vibrations in the frequency range 80-100 Hz as also described above. Again, the AHC 120 controls the control signal to the haptic motor 110M in order to not exceed predefined limit values. If the control signal exceeds the limits, the control signal is set to the limit value. The limit value is modifiable according to vehicle specifications.

It is to be understood that in some embodiments one or more characteristics of the haptic feedback profile may be a function of one or more additional factors such as cabin acoustic noise level.

The AHC 120 may generate haptic feedback according to the profile of FIG. 6B in the event a signal is received from the ADAS control module 150 indicating that the vehicle 1 is driving in autonomous mode in the highway and is approaching a condition outside of the domain of the autonomous mode such that a hand-over process from the vehicle to the driver has to be performed, or the driver monitoring system through the interior camera detects the driver drowsiness and the system reacts with a tactile warning. The ECU 120 may additionally/alternatively generate haptic feedback according to the profile of FIG. 6B in the event a signal is received from the ADAS control module 150 indicating the vehicle 1 is closing in on (approaching) a leading vehicle at an excessive relative speed.

Figure 7:
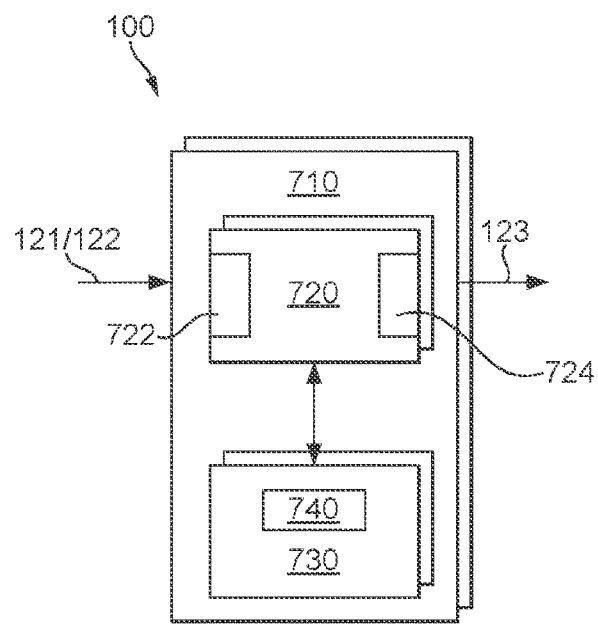
FIG. 7 shows a simplified example of a control system such as may be adapted in accordance with an embodiment of the disclosure.

With reference to FIG. 7, there is illustrated a simplified implementation of the control system 100 for controlling a haptic feedback actuator of a motor vehicle described above. The control system 100 comprises one or more controllers 710, such as the AHC 120, and is configured to:

receive vehicle parameter information being information indicative of a current value of at least one parameter associated with the vehicle;

receive information indicating that it is required to provide haptic feedback;

in response to receipt of information indicating that haptic feedback is required, generate a control signal for controlling operation of the haptic feedback actuator (110M), the control signal being responsive to the vehicle parameter information; and output the control signal.

It is to be understood that the or each controller 710 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 710 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 710 to implement the control techniques described herein (including some or all of the functionality required for the method described herein). The set of instructions could be embedded in said one or more electronic processors of the controller 710; or alternatively, the set of instructions could be provided as software to be executed in the controller 710. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 7, the or each controller 710 comprises at least one electronic processor 720 having one or more electrical input(s) 722 for receiving one or more input signal(s), such as input signals 121, 122, and one or more electrical output(s) 724 for outputting one or more output signal(s) 123. The or each controller 710 further comprises at least one memory device 730 electrically coupled to the at least one electronic processor 720 and having instructions 740 stored therein. The at least one electronic processor 720 is configured to access the at least one memory device 730 and execute the instructions 740 thereon so as to, in response to receipt of information indicating that haptic feedback is required, generate a control signal for controlling operation of the haptic feedback actuator, the control signal being responsive to the vehicle parameter information, and outputting the control signal.

The, or each, electronic processor 720 may comprise any suitable electronic processor (e.g., a microprocessor, a microcontroller, an ASIC, etc.) that is configured to execute electronic instructions. The, or each, electronic memory device 730 may comprise any suitable memory device and may store a variety of data, information, threshold value(s), lookup tables or other data structures, and/or instructions therein or thereon. In an embodiment, the memory device 730 has information and instructions for software, firmware, programs, algorithms, scripts, applications, etc. stored therein or thereon that may govern all or part of the methodology described herein. The processor, or each, electronic processor 720 may access the memory device 730 and execute and/or use that or those instructions and information to carry out or perform some or all of the functionality and methodology describe herein.

The at least one memory device 730 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 710 have been described comprising at least one electronic processor 720 configured to execute electronic instructions stored within at least one memory device 730, which when executed causes the electronic processor(s) 720 to carry out the method as hereinbefore described. However, it is contemplated that the present disclosure is not limited to being implemented by way of programmable processing devices, and that at least some of, and in some embodiments all of, the functionality and or method steps of the present disclosure may equally be implemented by way of non-programmable hardware, such as by way of non-programmable ASIC, Boolean logic circuitry, etc.

Figure 8:
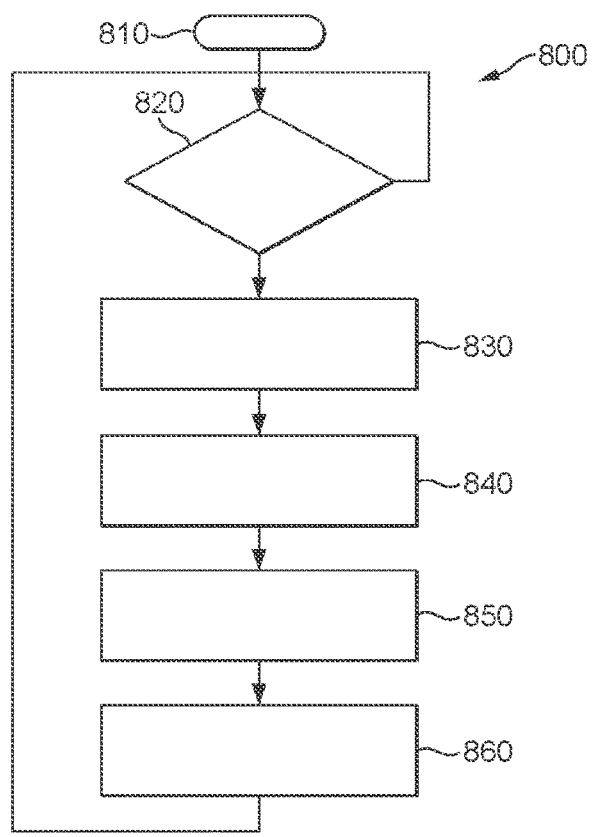
FIG. 8 illustrates a simplified flowchart 800 of an example of a method of providing haptic feedback in a vehicle

Referring to FIG. 8, there is illustrated a simplified flowchart 800 of an example of a method of providing haptic feedback in a vehicle, such a may be implemented by the AHC 120.

The method starts at 810 and moves on to 820 where in the illustrated embodiment the method waits until an indication is received that haptic feedback is required to be provided, for example based on a signal received from, or broadcast by, the ADAS control module 150. In alternative embodiments, the method may simply start (i.e. be initiated) upon receipt of an indication that haptic feedback is required.

Upon determining that haptic feedback is to be provided, the method moves on to 830, where vehicle parameter information indicative of a current value of at least one parameter associated with the vehicle, for example information indicative of haptic noise experienced by a driver of the vehicle, is received.

In the illustrated example, a desired type of haptic feedback to be provided is determined at 840. As described above, the type of haptic feedback to be provided may be determined based on the signal received from the ADAS control module 150.

A haptic feedback signal is generated at 850 in dependence on the received vehicle parameter information indicative of a current value of at least one parameter associated with the vehicle, and in the illustrated example also in dependence on the determined type of haptic feedback to be provided.

The haptic feedback signal is then output at 860, for example to the haptic feedback motor 110M to cause the haptic feedback motor to generate haptic feedback in dependence on the haptic feedback signal.

In the illustrated example, the method then loops back to 820 and waits until an indication is received that further haptic feedback is required to be provided. However, in alternative embodiments the method may end.

Throughout the description of this specification, the words "comprise" and "contain" and variations of the words, for example "comprising" and "comprises", means "including but not limited to", and is not intended to (and does not) exclude other moieties, additives, components, integers or steps.

Throughout the description of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the disclosure are to be understood to be applicable to any other aspect, embodiment or example described herein unless incompatible therewith.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A control system for controlling a haptic feedback actuator of a vehicle, the control system comprising one or more controllers, the control system configured to:
    receive vehicle parameter information being information indicative of a current value of at least one parameter associated with the vehicle;
    receive information indicating that haptic feedback is required;
    in response to receipt of information indicating that haptic feedback is required, generate a control signal for controlling operation of the haptic feedback actuator, the control signal being responsive to the vehicle parameter information; and
    output the control signal,
    wherein the vehicle parameter information comprises information indicative of haptic noise experienced by a driver of the vehicle over a prescribed frequency range, and the control system is arranged to generate the control signal to control the haptic feedback provided by the haptic feedback actuator to be output at a frequency within said prescribed frequency range and in phase with said haptic noise experienced by the driver.

2. The control system of claim 1, wherein the control system comprises a control system for controlling a haptic feedback actuator within a vehicle seat and the vehicle parameter information comprises information indicative of a current state of the vehicle seat.

3. The control system of claim 1, wherein the vehicle parameter information comprises at least one from a group consisting of at least one of:
    information indicative of a weight of a person sat on a vehicle seat;
    information indicative of a forward/aft position of the vehicle seat with respect to a body of the vehicle; and
    information indicative of a position of a back portion.

4. The control system according to claim 1, wherein said prescribed frequency range is from 80 Hz to 100 Hz.

5. The control system according to claim 1, wherein the control system is arranged to generate the control signal to control at least one of:
    an amplitude of the haptic feedback provided by the haptic feedback actuator in dependence at least in part on the vehicle parameter information;
    a frequency of vibrations of the haptic feedback provided by the haptic feedback actuator in dependence on the vehicle parameter information;
    an amplitude of vibrations of the haptic feedback provided by the haptic feedback actuator in dependence on the vehicle parameter information;
    a phase of vibrations of the haptic feedback provided by the haptic feedback actuator in dependence on the vehicle parameter information; and
    a duration of pulses of vibrations and/or period between pulses of vibrations provided by the haptic feedback actuator in dependence on the vehicle parameter information.

6. The control system according to claim 1, wherein the information indicative of a value of at least one parameter associated with the vehicle comprises information indicative of rate of acceleration of at least a portion of a structure of the vehicle.

7. The control system according to claim 6 wherein the control system is configured to receive information indicative of rate of acceleration of at least a portion of a structure of the vehicle from an accelerometer.

8. The control system according to claim 1, wherein the control system is configured to receive vehicle parameter information being information indicative of at least one of:
    a level of acoustic noise in a cabin of the vehicle;
    a speed of travel of the vehicle over ground; and
    a geographical location of the vehicle.

9. The control system of claim 1 comprised in a vehicle assembly in combination with the haptic feedback actuator.

10. The control system of claim 1 comprised in a vehicle seat.

11. The control system of claim 1 comprised in a vehicle.

12. A method of providing haptic feedback in a vehicle, comprising:

receiving vehicle parameter information being information indicative of a current value of at least one parameter associated with the vehicle; and receiving information indicating that haptic feedback is required, the method comprising, in response to receipt of information indicating that haptic feedback is required, controlling operation of a haptic feedback actuator, whereby controlling operation of the haptic feedback actuator comprises controlling the haptic feedback actuator responsive at least in part to the vehicle parameter information, wherein the vehicle parameter information comprises information indicative of haptic noise experienced by a driver of the vehicle over a prescribed frequency range, and control of the haptic feedback actuator is executed at a frequency within said prescribed frequency range and in phase with said haptic noise experienced by the driver.

13. A non-transitory, computer-readable storage medium storing instructions thereon that, when executed by one or more processors, causes the one or more processors to carry out the method of claim 12.

14. The method according to claim 12, wherein said prescribed frequency range is from 80 Hz to 100 Hz.

* * * * *